(12) United States Patent
Lee et al.

(10) Patent No.: US 9,233,663 B2
(45) Date of Patent: Jan. 12, 2016

(54) WIPER LEVER ASSEMBLY AND WIPER BLADE

(71) Applicants: Hyundai Motor Company, Seoul (KR); Kia Motors Corporation, Seoul (KR); ASMO Co., Ltd., Kosai, Shizuoka-Ken (KR)

(72) Inventors: Ki Young Lee, Gyeonggi-do (KR); Dong Soo Lee, Gyeonggi-do (KR); In Kwang Lee, Busan (KR); In Gue Cha, Gyeonggi-do (KR); Heui Geon Lee, Gyeonggi-do (KR); Shinichirou Amano, Shizuoka-Ken (JP)

(73) Assignees: Hyundai Motor Company, Seoul (KR); Kia Motors Corporation, Seoul (KR); Asmo Co. Ltd., Shizuoka (JP)

( * ) Notice: Subject to any disclaimer, the term of this patent is extended or adjusted under 35 U.S.C. 154(b) by 324 days.

(21) Appl. No.: 13/774,417

(22) Filed: Feb. 22, 2013

(65) Prior Publication Data
US 2013/0227808 A1    Sep. 5, 2013

(30) Foreign Application Priority Data
Feb. 24, 2012 (JP) .................... 2012-039154

(51) Int. Cl.
*B60S 1/34*    (2006.01)
*B60S 1/38*    (2006.01)

(52) U.S. Cl.
CPC .............. *B60S 1/34* (2013.01); *B60S 1/3801* (2013.01); *B60S 1/3806* (2013.01); *B60S 2001/3815* (2013.01); *B60S 2001/3843* (2013.01)

(58) Field of Classification Search
CPC ........ B60S 1/38; B60S 1/3801; B60S 1/3806; B60S 2001/3813; B60S 2001/3815; B60S 2001/3812; B60S 2001/3843
USPC ........... 15/250.43, 250.44, 250.201, 250.361
See application file for complete search history.

(56) References Cited

U.S. PATENT DOCUMENTS

| | | |
|---|---|---|
| 5,289,608 A | 3/1994 | Kim |
| 5,546,627 A | 8/1996 | Chen |
| 2009/0293218 A1 | 12/2009 | Fujiwara et al. |

(Continued)

FOREIGN PATENT DOCUMENTS

| | | | |
|---|---|---|---|
| FR | 2653083 | * | 4/1991 |
| GB | 2 139 528 A | | 11/1984 |

(Continued)

*Primary Examiner* — Gary Graham
(74) *Attorney, Agent, or Firm* — Mintz Levin Cohn Ferris Glovsky and Popeo, P.C.; Peter F. Corless (57) ABSTRACT

Disclosed herein is a wiper lever assembly which is configured to prevent detachment of end cover members, which includes a lever member (a center cover lever, secondary levers and yoke levers) gripping a rubber blade disposed thereunder, and an end cover member which covers an end of the lever member from above and which includes claws formed on both lateral sides thereof. The claws may be extended inwardly from the end cover and engage with both lateral sides of a lower surface of the lever member to grip the lever member. The end cover member includes a support wall which is formed at the center of a width of the end cover member and is extended downwardly therefrom, and the lever member includes a receptor (an insert tube and a proximal insert tube) in which the support wall is fitted from above.

6 Claims, 10 Drawing Sheets

(56) References Cited

U.S. PATENT DOCUMENTS

| | | |
|---|---|---|
| 2011/0162161 A1 | 7/2011 | Amado |
| 2013/0227808 A1 | 9/2013 | Lee et al. |
| 2013/0276255 A1 | 10/2013 | Lee et al. |

FOREIGN PATENT DOCUMENTS

| | | |
|---|---|---|
| JP | 59-213547 A | 12/1984 |
| JP | 1992-108470 U | 9/1992 |
| JP | H04-108470 U | 9/1992 |
| JP | 2000-203391 A | 7/2000 |
| JP | 2003-127840 A | 5/2003 |
| JP | 2005-206122 A | 8/2005 |
| JP | 2006-021650 A | 1/2006 |
| JP | 2006021650 A | 1/2006 |
| JP | 2007-055589 A | 3/2007 |
| JP | 2008-168796 A | 7/2008 |
| JP | 2010-018273 A | 1/2010 |
| JP | 2012-121367 A | 6/2012 |
| KR | 1020000069488 A | 11/2000 |
| KR | 10-2005-0078199 A | 8/2005 |
| KR | 10-2008-0094204 A | 10/2008 |
| KR | 1020080094204 A | 10/2008 |
| KR | 10-2008-0099013 A | 11/2008 |
| KR | 1020080099013 A | 11/2008 |
| KR | 10-2012-0039111 A | 4/2012 |
| KR | 1020120039111 A | 4/2012 |
| KR | 10-2012-0048901 A | 5/2012 |
| WO | 2010/035794 A1 | 4/2010 |
| WO | 2013/080694 A1 | 6/2013 |

\* cited by examiner

*Fig. 8*

WIPER LEVER ASSEMBLY AND WIPER BLADE

BACKGROUND OF THE INVENTION

1. Field of the Invention

The present invention relates to a wiper lever assembly and wiper blade.

2. Description of the Related Art

Among conventional wiper blades, a particular wiper blade is known which includes a lever member that includes an upper lever, with a lower lever coupled to the upper lever so that the longitudinal center of the lower lever is pivotally connected to a longitudinal end of the upper lever to configure a tournament shape, a rubber blade disposed beneath and gripped by the lever member, and a cover member which covers the lever member from above. The cover member of the wiper blade is provided at both lateral sides thereof with claws which extend inwardly toward each other and engage with both lateral sides of a lower surface of the lever member in order to grip the lever member, thus enabling the cover member to be mounted on the lever member.

When a lever member includes levers coupled to each other in a multi-joint manner, a cover member is typically divided into separate cover members. That is, an intermediate cover member covers a longitudinal intermediate section of the lever member, and end cover members cover a longitudinal distal portion of the lever member, to improve the ability of the cover member to follow the lever member accordingly.

However, when the end cover members which cover longitudinal ends of the lever member are mounted on just the lever member by the engagement of claws thereof with the lever member, and when a lateral load is applied to the end cover member during a wiping action, such as when a piece of snow obstructs the longitudinal end of the end cover member, the claws can be disengaged and in some cases the end cover member may detach.

SUMMARY OF THE INVENTION

Accordingly, the present invention has been made keeping in mind the above problems occurring in the prior art, and an object of the present invention is to provide a wiper lever assembly and a wiper blade which are configured to prevent the detachment of end cover members.

In a first aspect of the present invention, a wiper lever assembly includes: a lever member configured to grip a rubber blade disposed thereunder; and an end cover member which is configured to cover an end of the lever member from above, and which includes claws formed on both lateral sides thereof. The claws are extended in an inward direction from the end cover and engage with both lateral sides of a lower surface of the lever member to grip the lever member. More specifically, the end cover member includes a support wall which is formed at the center of a width of the end cover member and is extended in a downward direction therefrom. Additionally, the lever member includes a receptor in which the support wall is fitted from above.

According to the first aspect, since the support wall of the end cover member is fitted in the receptor of the lever member from above, when a piece of snow obstructs the longitudinal end (outer end) of the end cover member thus applying a lateral load to the longitudinal end during wiping action, the support wall and the receptor can now accommodate the load. As a result, the action applied to the claws is mitigated, thus preventing the disengagement of the claws and thus the detachment of the end cover member.

In a second aspect of the present invention according to the first aspect, the support wall may be divided into two support walls which are formed at positions on the end cover member spaced apart from each other in a longitudinal direction, and the receptor may include two receptors which are formed to correspond to the respective support walls.

According to the second aspect, since the support walls are disposed at two positions on the end cover member longitudinally spaced apart from each other, the load locally applied to the support walls can be reduced. In comparison, when the support walls are provided at a single position, the strength of the support walls can be more easily assured, and the support walls can as a result be made slimmer. Furthermore, although the load applied to the longitudinal end of the support wall is reduced by increasing the longitudinal length of the single support wall, the second lever may require a corresponding receptor which has a larger length, thus deteriorating strength of the lever member. In contrast, according to exemplary embodiment of the present invention, the receptors may be provided to correspond to the respective support walls and thus the lever member does not require the longer corresponding receptor as a result. This improves the overall strength of the lever member.

In a third aspect of the present invention according to the first or second aspect, the claws may be formed at two positions on the end cover member spaced apart from each other in a longitudinal direction, and the claws disposed at a position near the longitudinal end of the lever member may be formed to have a longitudinal width larger than that of the claws disposed at a position near the longitudinal center of the lever member.

According to the third aspect, the claws are provided at two positions on the end cover member longitudinally spaced apart from each other, and the claws disposed at a position near the longitudinal end of the lever member are formed to have a width that is larger than that of the claws disposed at a position near the longitudinal center of the lever member. Consequently, in comparison to when the claws are modified into a single longer claw without spacing, this aspect can reduce the consumption of materials and can improve the strength of the claws and thus improve resistance to a force which is applied to lift the longitudinal end (outer end) of the end cover member. More specifically, when the longitudinal end (outer end) of the end cover member is intended to be lifted while the rubber blade is firmly sticking to a wiping surface due to freezing, the claws disposed at a position near the longitudinal end of the lever member may be provided with a load that is greater than that applied to the claws disposed at the position near the longitudinal center of the lever member. Consequently, this aspect can optimize the strength of the claws.

In a fourth aspect of the present invention according to any of the first to third aspects, the end cover member may include movement-suppressing protrusions which are formed on inner lateral surfaces of the end cover member above the claws and engage with lateral surfaces of the lever member to suppress flexibility or "play" of the lever member in a width direction, and each of the claws may be connected to the inner surface of the end cover member with a round corner formed between the upper proximal end of the claw and the inner surface of the end cover member.

According to the fourth aspect, since each movement-suppressing protrusion is formed at a position upwardly spaced apart from the claw, there is no perpendicular contact of the upper proximal portion of the claw with respect to the movement-suppressing protrusion. Furthermore, because the round corner having a round transverse section is provided between the proximal end of the claw and the inner surface of the end cover member, it is possible to prevent stress concentration on the proximal end of the claw and to assure the desirable strength of the claw.

In a fifth aspect of the present invention according to any of the first to fourth aspects, the claws may be formed at two positions of the end cover member spaced apart from each other in a longitudinal direction, and the claws disposed at a position near the longitudinal end of the lever member may be formed to engage at the center area in a claw width direction with the outmost end of a bottom edge of the lever member.

According to the fifth aspect, since the claw disposed at the longitudinal end of the lever member engages at the center area in a claw width direction with the outmost end of a bottom edge of the lever member, the center area of the claw can accommodate force which is applied to lift the longitudinal end (the outer end) of the end cover member, thus providing the desirable strength of the claw.

In a sixth aspect of the present invention according to any of the first to fifth aspects, a wiper blade includes: a wiper lever assembly disclosed in any of the above aspects; and a rubber blade gripped by a lever member. According to the sixth aspect, the wiper blade can obtain the effects resulting from any the above aspects.

BRIEF DESCRIPTION OF THE DRAWINGS

The above and other objects, features and advantages of the present invention will be more clearly understood from the following detailed description taken in conjunction with the accompanying drawings, in which.

REFERENCE NUMERALS

11: wiper lever assembly
13: rubber blade
21: center cover lever
22: secondary lever
22e: insert tube
22i: proximal insert tube
22k: outmost end
23, 24: yoke lever
25: end cover member
25b: first claw
25c: second claw
25d, 25f: movement-suppressing protrusion
25g, 25h: support wall
W1, W2: claw width

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a preferred embodiment of the present invention will be described in detail with reference to FIGS. 1 to 8.

Figure 1:
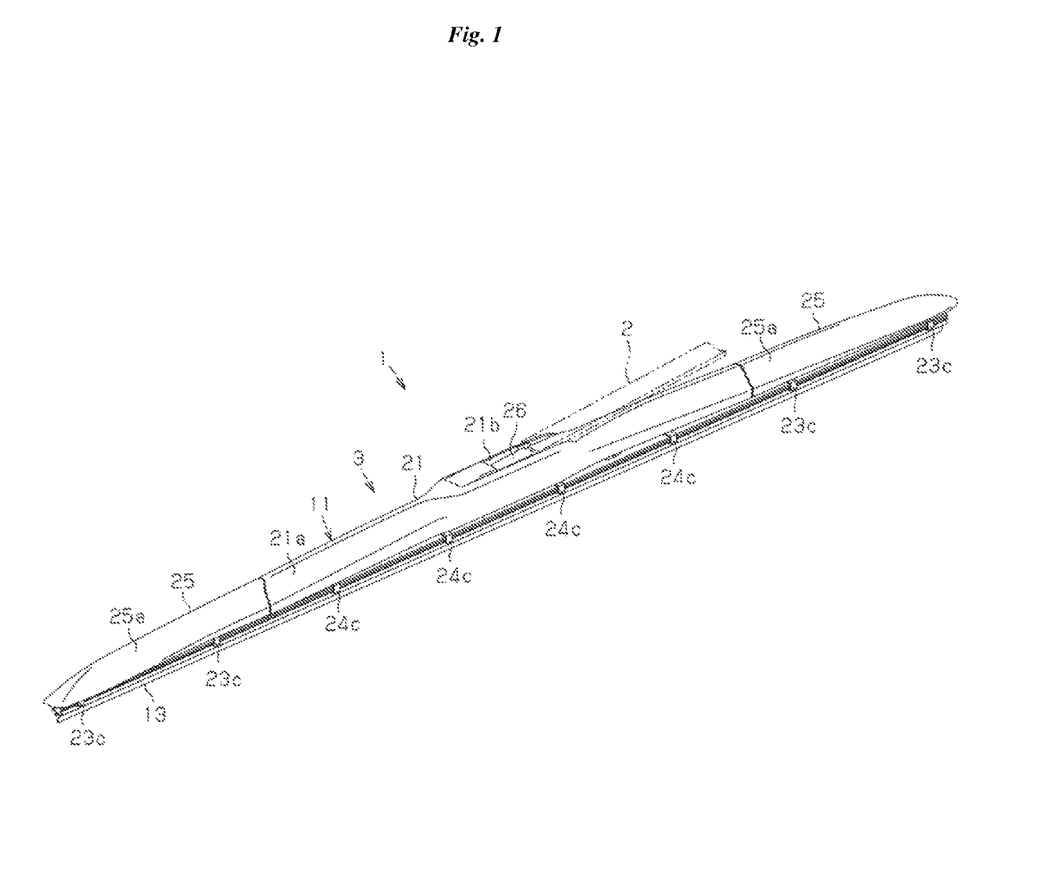
FIG. 1 is a perspective view of an vehicle wiper according to an exemplary embodiment of the present invention.

As shown in FIG. 1, an vehicle wiper 1 according to an exemplary embodiment of the present invention, which is configured to wipe away substances adhering to a wiping surface of a windshield of an vehicle, includes a wiper aim 2, and a wiper blade 3 coupled to the wiper arm 2. The wiper aim 2 has a proximal end fixed to a pivot shaft (not shown) that is rotated back and forth within a predetermined angular range by the driving force of a wiper motor (not shown), and thus swings back and forth by the back and forth rotation of the pivot shaft. Furthermore, the wiper aim 2 is biased at a distal end toward the windshield (wiping surface) by a biasing mechanism (not shown). More specifically, the wiper blade 2 is coupled to the distal end of the wiper aim 2.

The wiper blade 3 includes a wiper lever assembly 11, and backings 12 (for example, see FIG. 4D) and a rubber blade 13, both of which are gripped by the wiper lever assembly 11). The wiper lever assembly 11 includes a lever member which is composed of an upper lever, with a lower lever being coupled to the upper lever such that a longitudinal end of the upper lever is pivotally connected to a longitudinal center of the lower lever.

Figure 2:
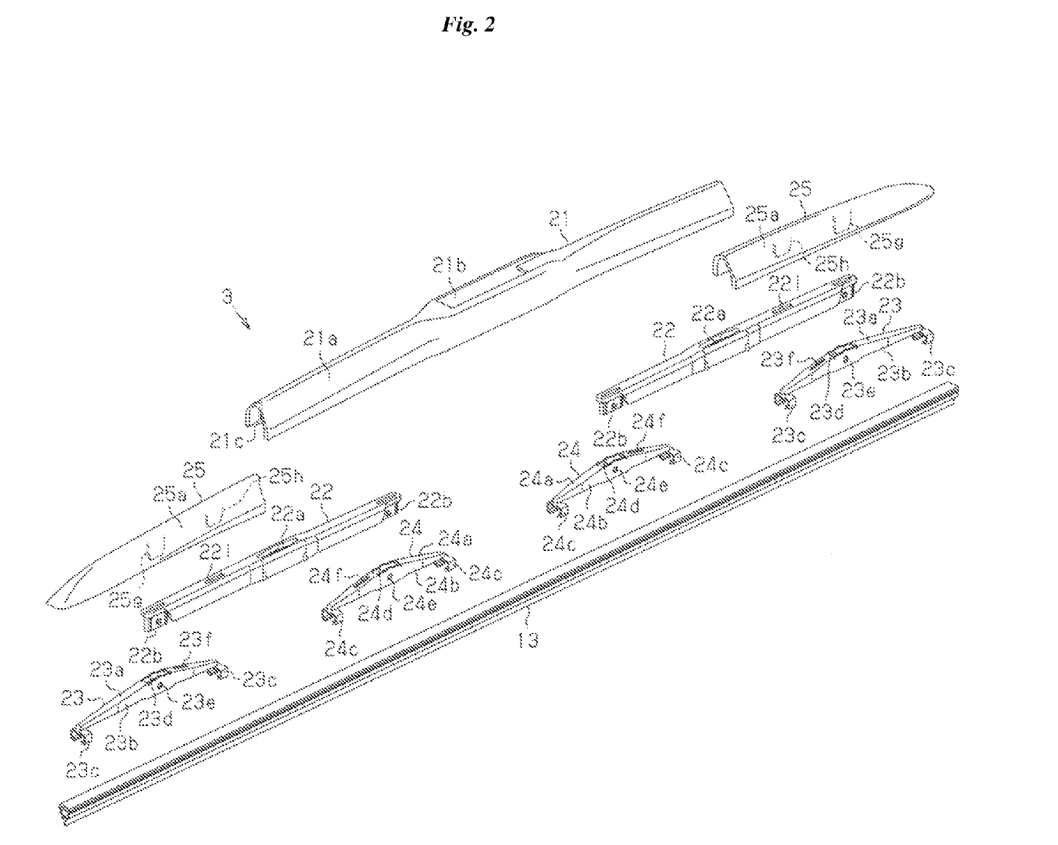
FIG. 2 is a partially exploded perspective view of the wiper blade according to the exemplary embodiment of the present invention.

More specifically, the wiper lever assembly 11 according to the exemplary embodiment of the present invention includes a lever member composed of a center lever cover lever 21, a pair of secondary levers 22, four yoke levers 23, 24, and a pair of end cover members 25, as shown in FIG. 2.

Figure 3:
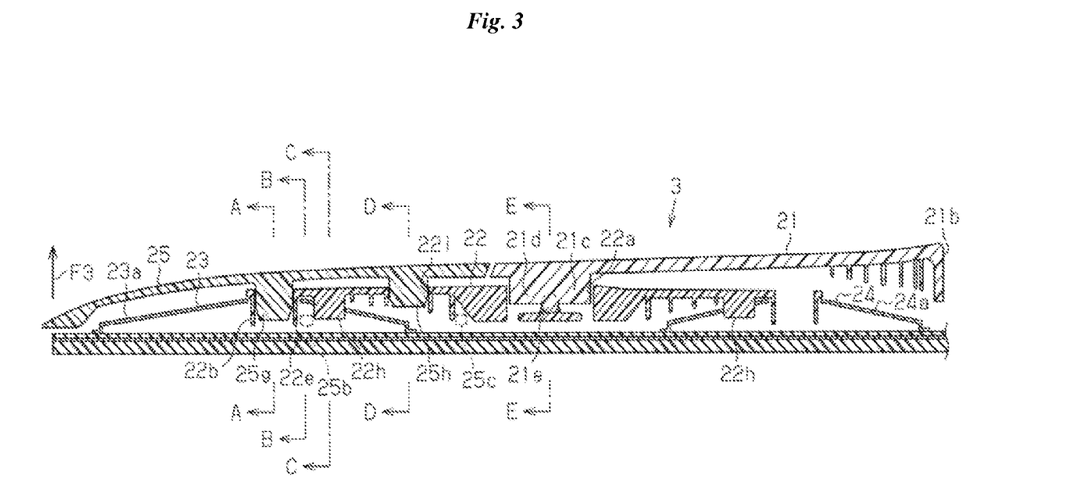
FIG. 3 is a partial cross-sectional view of the wiper blade according to the exemplary embodiment of the present invention.
Figure 4A:
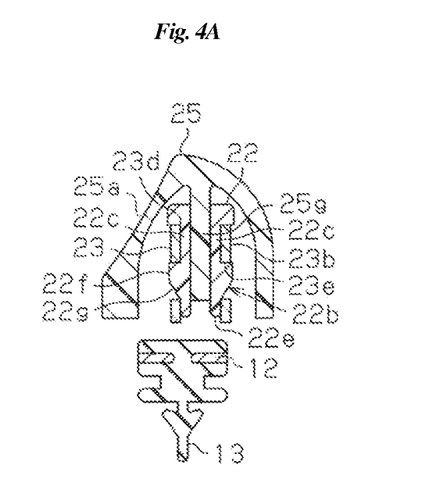
FIG. 4A is a cross-sectional view taken along a line A-A in FIG. 3.
Figure 4B:
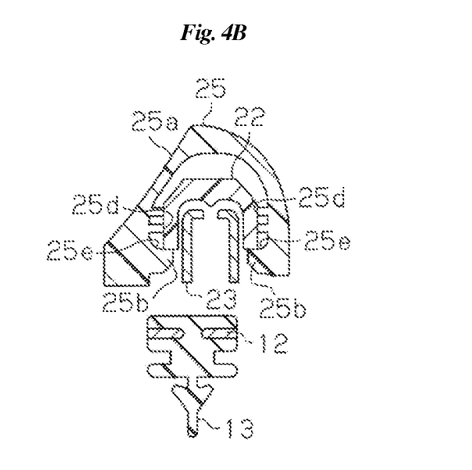
FIG. 4B is a cross-sectional view taken along a line B-B in FIG. 3.

The center cover lever 21, which may be made of resin material, is configured to have an approximate inverted U-shaped transverse section. The center cover lever 21 is provided along almost the entire area of a front surface (except an intermediate area) with a fin portion 21a that is configured to convert wind pressure applied to a traveling vehicle into a pushing force against the wiping surface (see FIGS. 2 and 4E). In addition, the center cover lever 21 has a clip connection opening 21b formed at the center portion of its length, and a clip 26 which is disposed under the opening 21b and pivotally coupled to a transverse pin, and to which the distal end of the wiper aim 2 is removably mounted as shown in FIG. 1. Furthermore, the center cover lever 21 includes center connectors 21c formed at the opposite ends thereof (see FIGS. 3 and 4E). As shown in FIGS. 3 and 4E, each of the center connecting members 21c according to the exemplary embodiment includes a plate-shaped portion 21d which protrudes in a downward direction from the center in a width direction, and a center shaft portion 21e which protrudes in a width direction from the center of a lower surface of the plate-shaped portion 21d in a width direction. Each of the secondary levers 22 is pivotally connected at the longitudinal center thereof to the opposite ends (the center connecting members 21c) of the center cover lever 21.

Figure 4C:
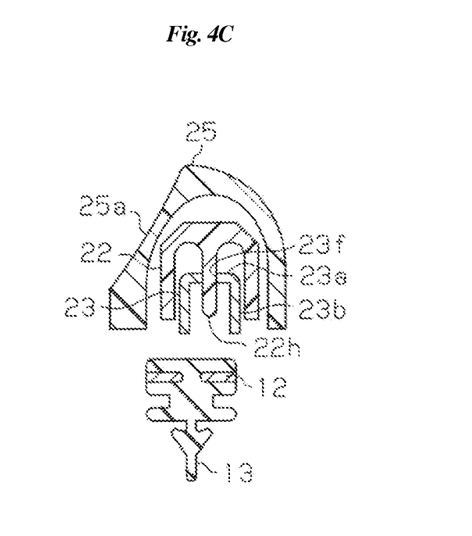
FIG. 4C is a cross-sectional view taken along a line C-C in FIG. 3.
Figure 4D:
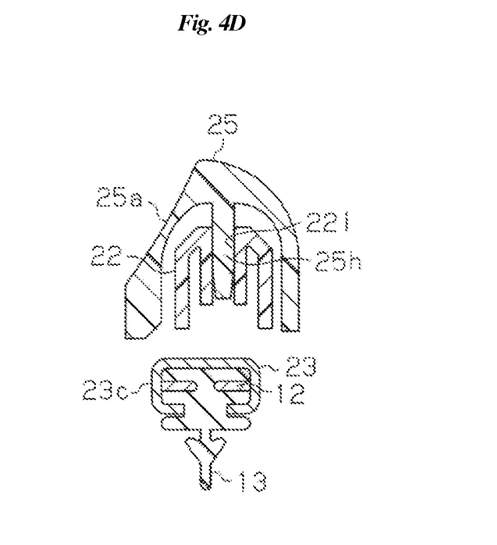
FIG. 4D is a cross-sectional view taken along a line D-D in FIG. 3.
Figure 4E:
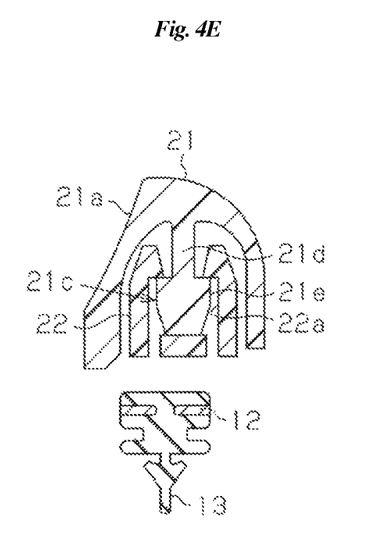
FIG. 4E is a cross-sectional view taken along a line E-E in FIG. 3.

The secondary lever 22, which may also be made of a resin material, is configured to have an approximate inverted U-shaped transverse section (see FIG. 4C). As shown in FIGS. 2, 3 and 4E, the secondary lever 22 is provided at the longitudinal center with a connecting aperture 22a, in which the center connecting member 21c is fitted, thus enabling the secondary lever 22 to be pivotally connected to the center cover lever 21 and to be rotated about the center shaft portion 21e. The secondary lever 22 is provided at opposite ends with the yoke levers 23, 24 in such a manner that each of the opposite ends of the secondary lever 22 is pivotally connected to the longitudinal center of the corresponding yoke lever 23 or 24.

More specifically, as shown in FIGS. 2 to 5, each of the yoke levers 23, 24, which is made of metallic material, is configured to have an approximate inverted U-shaped transverse section, and has a top wall 23a or 24a and a pair of lateral walls 23b or 24b which protrudes downwardly from both lateral sides of the top wall 23a or 24a. Each of the yoke levers 23, 24 further includes grip portions 23c, 24c for gripping the rubber blade 13 in which a backing 12 is embedded. Each of the top walls 23a, 24a is provided at the longitudinal center with an elongated aperture 23d or 24d which is extended longitudinally as viewed from above. Each of the elongated apertures 23d, 24d has the same width as that of the top (upper) walls 23a, 24a, so that each of the top walls 23a, 24a is divided oppositely in a longitudinal direction. Each of the lateral walls 23b, 24b is provided at the longitudinal center with a pivotal connecting aperture 23e or 24e. Each of the top walls 23a, 24a is provided with a support aperture 23f or 24f at an area inside the longitudinal center of the top wall 23a or 24a (an area covered with the secondary lever 22), in which the support aperture 23f or 24f is extended longitudinally as viewed from above.

Figure 5:
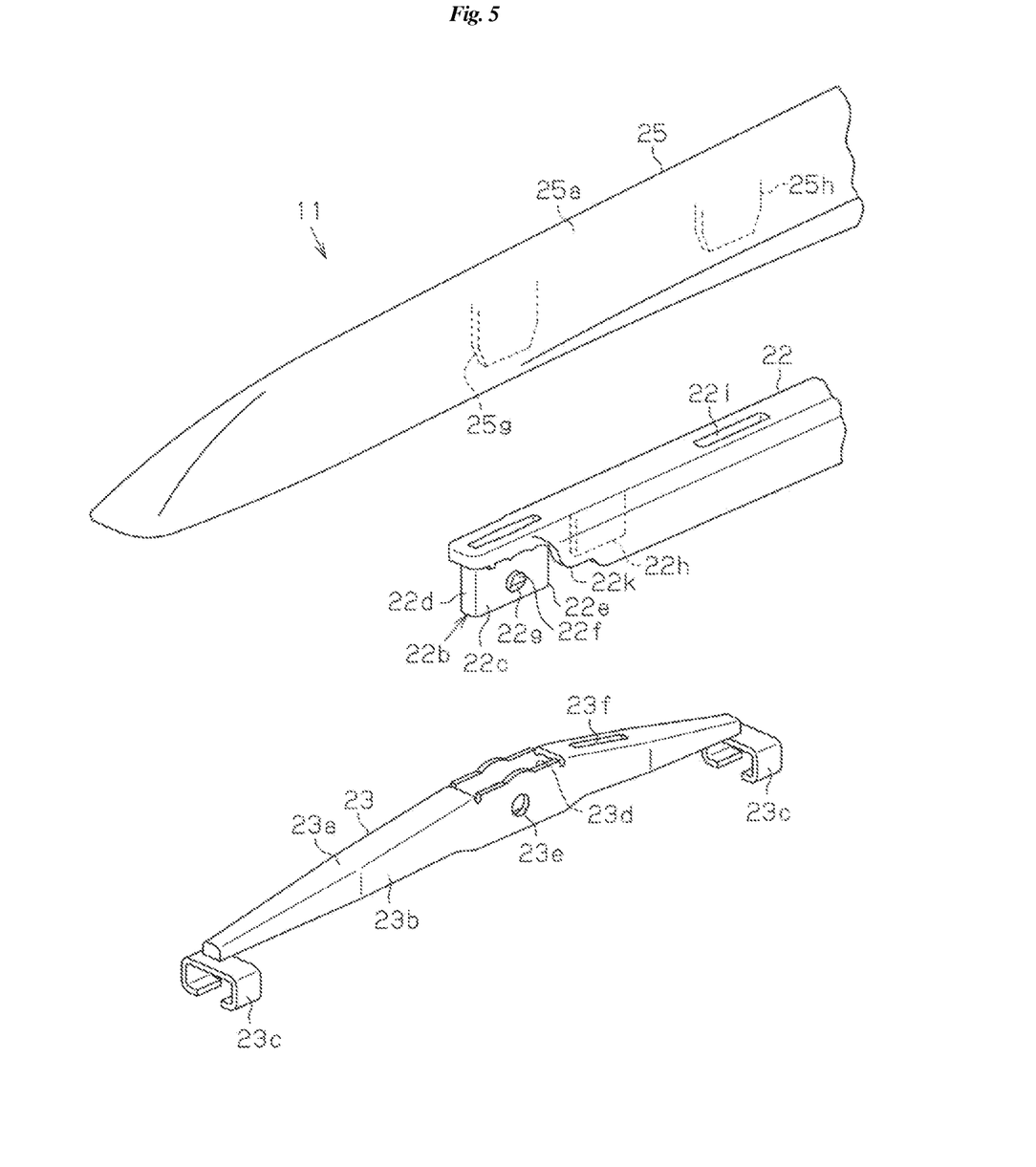
FIG. 5 is a partially exploded enlarged view of a wiper lever assembly according to the exemplary embodiment of the present invention.

As shown in FIG. 5, at the opposite ends of the secondary lever 22, only the top wall among the inverted U-shaped walls in the exemplary embodiments may be extended longitudinally, and the extended top wall portion is provided with an insert connecting member 22b which is extended in a downward direction and inserted and fitted in the elongated apertures 23d, 24d from above.

As shown in FIGS. 4A and 5, the insert connecting member 22b may include a pair of opposite lateral walls 22c which are extended in parallel to each other to face inner surfaces of the pair of lateral walls 23b or 24b, and a pair of end walls 22d connecting ends of the opposite lateral walls 22c, so that the insert connecting member 22b is provided with a rectangular insert tube 22e which is extended longitudinally as viewed from below and is vertically extended along the height of the secondary lever 22. In addition, as is also shown in FIGS. 4a and 5, the insert connecting member 22b includes pivotal connecting pins 22f which laterally protrude from the longitudinal center of the pair of opposite lateral walls 22c and are fitted in the pivotal connecting apertures 23e or 24e to serve as a pivotal center. Each of the pivotal connecting pins 22f is configured to have a circular section as viewed from a side view, and is provided on an end face thereof with an inclined surface which is positioned on a lower half area of the end face of the pivotal connecting pin 22f and is inclined in a downward and inward direction.

The yoke levers 23, 24 are pivotally connected to the secondary lever 22 in such a way that the insert connecting member 22b is inserted into the elongated aperture 23d, 24d from above. Specifically, upon inserting the insert connecting member 22b into the elongated aperture 23d, 24d from above, as the inclined surface 22g is inserted into the elongated aperture 23d, 24d, the pair of opposite lateral walls 22c are bent at intermediate portions thereof toward each other. Subsequently, the pivotal connecting pins 22f are fitted in the pivotal connecting apertures 23 or 24e while the bent condition of the pair of lateral walls 22c is released. As a result, the yoke levers 23, 24 are connected to the secondary lever 22.

As shown in FIG. 4C, the secondary lever 22 is provided with yoke support walls 22h which are fitted in the support apertures 23f, 24f of the yoke levers 23, 24 and engage with the yoke levers 23, 24 in a width direction so as to reduce lateral movement "play" of the yoke levers 23, 24 with respect to the secondary lever 22. The dimensions of the yoke support wall 22h are such that the yoke levers 23, 24 can be pivoted with respect to the secondary lever 22 and thus can follow the wiping surface of the windshield while the yoke support wall 22h is fitted in the support apertures 23f, 24f.

Figure 6A:
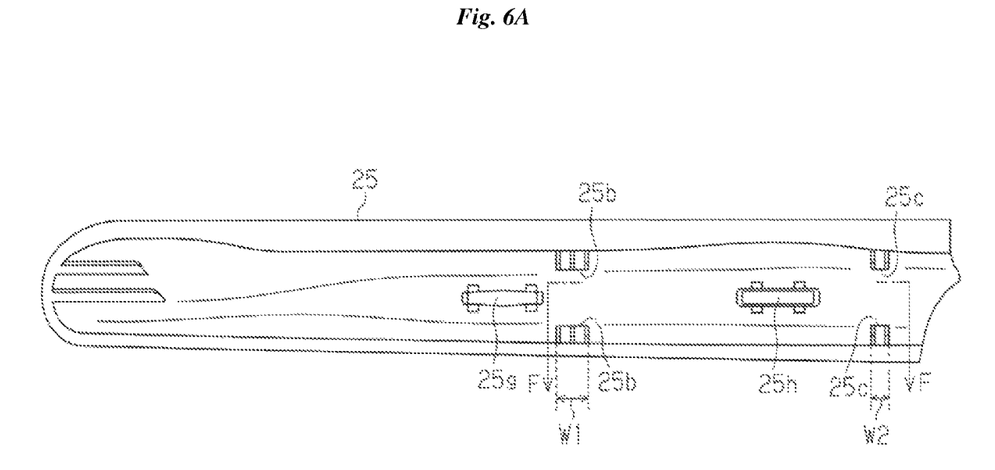
FIG. 6A is a bottom view of an end cover member according to the exemplary embodiment of the present invention.
Figure 6B:
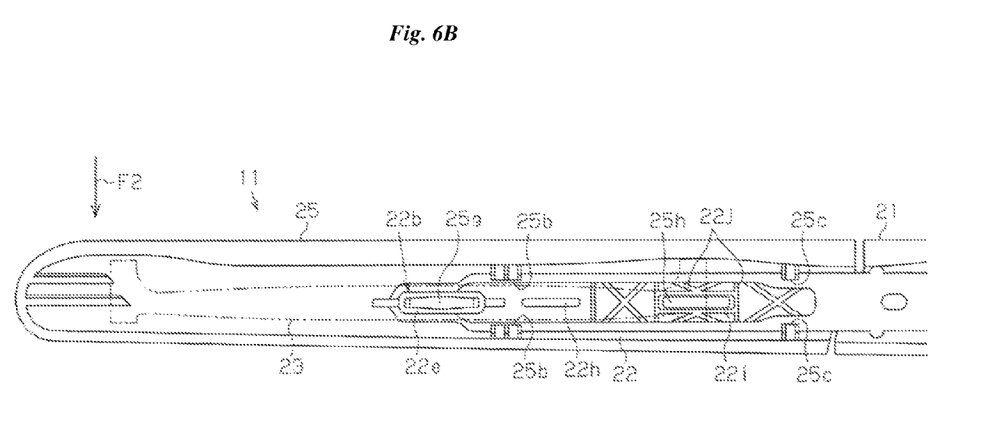
FIG. 6B is a partial bottom view of the wiper lever assembly according to the exemplary embodiment of the present invention.

As shown in FIGS. 2 and 3, formed between the connecting aperture 22a and the insert connecting member 22b (the insert tube 22e) of the top wall of the secondary lever 22 is a rectangular proximal insert tube 22i which extends longitudinally and vertically. As shown in FIG. 6B, the proximal insert tube 22i according to the exemplary embodiment is provided therearound with a plurality of ribs 22j which serves to connect the proximal insert tube 22i with the lateral walls of the secondary lever 22.

As shown in FIG. 2, FIG. 3 and FIGS. 4B to 4D, the longitudinal end of the secondary lever 22 is provided with an end cover member 25 such that a part of the secondary lever 22 which protrudes longitudinally from the end of the center cover lever 21 and a part of the yoke lever 23 which protrudes longitudinally from the end of secondary lever 22 are covered with the end cover member 25. The end cover member 25, which may be made of a resin material, is configured to have an approximate inverted U-shaped transverse section. The end cover member 25 is provided along substantially the entire area of a front surface with a fin portion 25a configured to convert wind pressure which is applied to a traveling vehicle into a pushing force against the wiping surface (see FIGS. 4A to 4D). The fin portion 25a is configured to be smoothly connected to the fin portion 21a of the center cover lever 21.

As shown in FIG. 4B and FIGS. 6 to 8, the end cover member 25 is provided on both lateral sides with first and second claws 25b, 25c which are extended inwardly in a width direction and engage with both lateral sides of the bottom surface of the secondary lever 22. Consequently, the end cover member 25 holds the secondary lever 22 via the first and second claws 25b, 25c to enable the end cover member 25 to be firmly mounted on the secondary lever 22.

The first and second claws 25b, 25c according to the exemplary embodiment are provided at two locations on the end cover member 25 spaced apart from each other. More specifically, the first claws 25b, which are disposed at a position near the longitudinal end (the outer end) of the wiper lever assembly 11 (the lever member), are formed at the approximate longitudinal center of the end cover member 25 in the at or substantially near the end of the secondary lever 22. Meanwhile, the second claws 25c, which are disposed at a position near the longitudinal center of the wiper lever assembly 11, are formed in or substantially near the proximal end of the end cover member 25.

As shown in FIG. 6A, a claw width (W1) of the first claws 26b according to the exemplary embodiment, which is measured in a longitudinal direction, is configured to be larger than a claw width (W2) of the second claws 25c.

Figure 8:
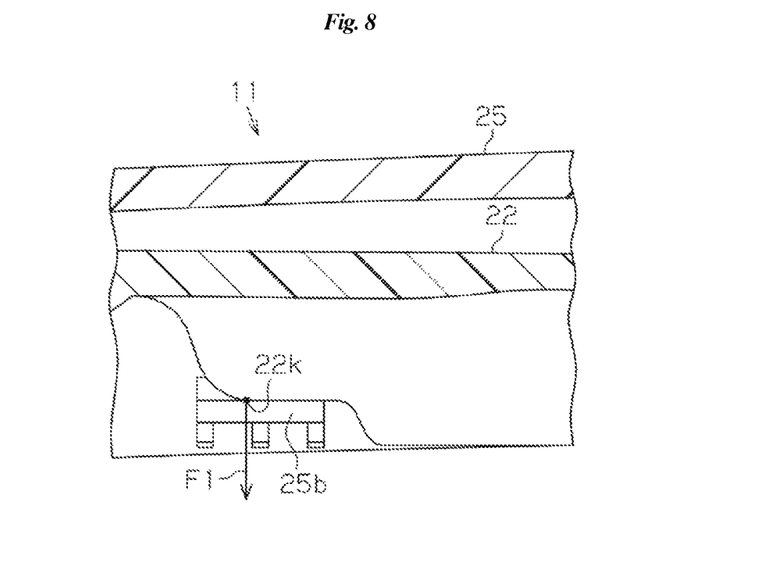
FIG. 8 is a partial sectional view showing a region around a first claw portion according to the exemplary embodiment of the present invention.

As shown in FIG. 8, the first claws 25b are configured to engage at the center area (in a claw width direction) with the outmost end 22k of a bottom edge of the secondary lever 22. In other words, the position of the outmost end 22k of the bottom edge of the secondary lever 22 is set such that a main load is applied to the center area of the first claw 25b (see arrow F1 in FIG. 8) when the longitudinal end (the outer end) of the end cover member 25 is intended to be lifted. The outmost end 22k of the secondary lever 22 is shaped to have a round edge without an angled corner, as shown in FIGS. 5 and 8.

Figure 7:
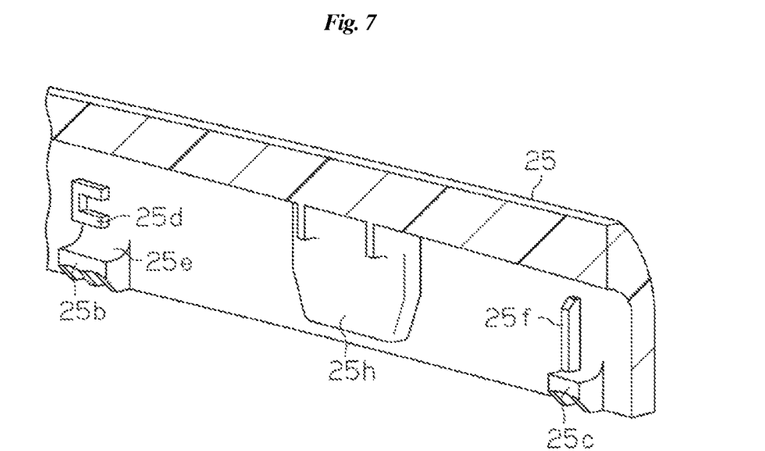
FIG. 7 is a sectional perspective view taken along a line F-F in FIG. 6A.

As shown in FIGS. 4B and 7, the end cover member 25 is provided with movement-suppressing protrusions 25d such that the movement-suppressing protrusions 25d are disposed at positions of both inner lateral surfaces of the end cover member 25 upwardly spaced apart from the first claws 25b and engage with the lateral surfaces of the second lever 22 to suppress the movement or "play" of the second lever 22 in a width direction. As shown in FIG. 4B, the area between the proximal end of the first claw 25b and the inner lateral surfaces of the end cover member 25 may be shaped to have a round section. That is, a round corner 25e is provided between the proximal end of the first claw 25b and the inner lateral surfaces of the end cover member 25.

As shown in FIG. 7, the end cover member 25 is further provided with movement-suppressing protrusions 25f such that the movement-suppressing protrusions 25f are disposed at positions of both inner lateral surfaces of the end cover member 25 upwardly spaced apart from the second claws 25c and engage with the lateral surfaces of the second lever 22 to suppress the "play" of the second lever 22 in a width direction.

As shown in FIGS. 3, 4A, 5 and 6, the end cover member 25 is provided at a lateral center of the inner surface with a support wall 25g so that the support wall 25g is extended in a downward direction from the inner surface of the end cover member 25 and is inserted in the insert tube 22e (the insert connecting member 22b) from above. As shown in FIGS. 3, 4D, 5 and 6, the end cover member 25 is further provided at a lateral center of the inner surface with a support wall 25h so that the support wall 25h extends in a downward direction from a position of the inner surface of the end cover member 25 spaced apart from the support wall 25g and is inserted in the proximal insert tube 229 from above. As shown in FIGS. 3, 4A, 4D and 6B, when the end cover member 25 is mounted on the second lever 22 by means of the first and second claws 25b, 25c, the support wall 25g may be fitted in the insert tube 22e and the other support wall 25h may also be fitted in the proximal insert tube 22i. At this point, the support wall 25h may be disposed between the first and second claws 25b, 25c which are formed at two positions of the end cover member 25 spaced apart from each other in a longitudinal direction, as apparent from FIG. 6. As shown in FIG. 4A, since the support wall 25g is fitted in the insert tube 22e (the insert connecting member 22b), the warpage (depression) of the pair of opposite lateral walls 22c may be suppressed.

Operations of the vehicle wiper 1 according to the embodiment of the present invention will now be described in reference to the structure above.

In the vehicle wiper 1, the distal end of the wiper arm 2 is biased against a windshield (wiping surface) by a biasing mechanism (not shown), and the pushing force is transmitted to the rubber blade 13 via the clip 26, the center cover lever 21, the secondary lever 22 and the yoke levers 23, 24, with the result that the rubber blade 13 achieves firm contact with a windshield over the entire length. While the vehicle is in motion, the wind pressure which is applied to the fin portions 21a, 25a is converted into a pushing force against the windshield (wiping surface), and the converted pushing force is transmitted to the yoke levers 23, 24 via the end cover member 25 and the secondary lever 22, thus causing the rubber blade 13 to come into contact with the windshield. Consequently, when the wiper arm 2 pivotally swings around the pivot shaft, the desirable wiping action is obtained.

Hereinafter, the conspicuous effects of the embodiment of the present invention will be described.

(1) The support walls 25a, 25h of the end cover member 25 are fitted in the insert tube 22e and the proximal insert tube 22i of the secondary lever 22 from above. Consequently, when, for example, a piece of snow obstructs the longitudinal end (outer end) of the end cover member 25 thus applying a lateral load to the longitudinal end during wiping action (see arrow F2 in FIG. 6B), the load can be accommodated by the support walls 25g, 25h, the insert tubes 22e and the proximal insert tube 22i. As a result, the action applied to the first and second claws 25b, 25c is mitigated, thus preventing the disengagement of the first and second claws 25b, 25c and thus the detachment of the end cover member 25.

(2) since the support walls 25g, 25h are disposed at two positions on the end cover member 25 longitudinally spaced apart from each other, the load locally applied to the support walls 25g, 25h can be reduced. In comparison to when the support walls are provided at a single position, the strength (endurance) of the support walls 25g, 25h can be improved, and the support walls 25g, 25h can be made slimmer as a result. Furthermore, in previous configurations, the second lever requires a corresponding receptor which has a larger length. This deteriorates the strength of the lever member. In contrast, according to the exemplary embodiment, the insert tube 22e and the proximal insert tube 22i act as the corresponding receptor to correspond to the respective support walls 25g, 25 and thus the secondary lever 22 does not require the longer corresponding receptor, thus again improving the strength (endurance) of the secondary lever 22.

(3) In the wiper lever assembly 11 (the lever member) according to the exemplary embodiment, the first and second claws 25b, 25c are provided at two positions on the end cover member 25 longitudinally spaced apart from each other, and the first claws 25b (having a claw width W1), which are disposed at a position near the longitudinal end of the wiper lever assembly 11 (the lever member), are formed to be larger than that of the second claws 25c (having a claw width W2), which are disposed at a position near the longitudinal center of the wiper lever assembly 11. Consequently, as compared to the case in which the first and second claws 25b, 25c are modified into a single longer claw (there is no spacing), the exemplary embodiment of the present invention reduces the consumption of materials and improves the strength of the first and second claws 25b, 25c and thus improves resistance to a force which is applied to lift the longitudinal end (outer end) of the end cover member 25 (see arrow F3 in FIG. 3). More specifically, when the longitudinal end (outer end) of the end cover member 25 is intended to be lifted while the rubber blade 13 is firmly sticking to a wiping surface due to freezing (see arrow F3 in FIG. 3), the first claw 25b is provided with a load which is greater than that applied to the second claw 25c. Consequently, the exemplary embodiment of the present invention optimizes the strength of the first and second claws 25b, 25c.

(4) Because the movement-suppressing protrusion 25d is formed at a position upwardly spaced apart from the first claw 25b, there is no perpendicular contact of the upper proximal portion of the first claw 25b with respect to the movement-suppressing protrusion 25d. Furthermore, because the round corner 25e having a round transverse section is provided between the proximal end of the first claw 25b and the inner surface of the end cover member 25, it is possible to prevent stress concentration on the proximal end of the first claw 25b and to assure the desirable strength of the first claw 25b with ease.

(5) Because the first claw 25b is configured to engage at the center area (in a claw width direction) with the outmost end 22k of a bottom edge of the secondary lever 22, the center area of the first claw 25b can accommodate force which is applied to lift the longitudinal end (the outer end) of the end cover member 25 (see arrow F3 in FIG. 3), thus providing the desirable strength of the first claw 2b. In other words, when the first claw 25b is configured to engage at the entire length with the bottom edge of the secondary lever 22, a stress, which is caused by the force (see arrow F3 in FIG. 3) applied to the longitudinal end (the outer end) of the end cover member 25 to lift the longitudinal end, is concentrated on the longitudinal end (corner) of the first claw. However, the exemplary embodiment of the present invention can prevent the stress concentration on the longitudinal end.

The exemplary embodiment of the present invention may be modified as follows.

Although it has been disclosed in the above exemplary embodiment that the support walls 25g, 25h are formed at two positions on the end cover member 25 which are longitudinally spaced apart from each other, the support walls (and the corresponding receptors) may be merged into a single support wall without limitation.

Although it has been disclosed in the above exemplary embodiment that the claw width (W1) of the first claw 25b is set to be larger than the claw width (W2) of the second claw 25c, the claw width (W1) of the first claw 25b and the claw width (W2) of the second claw 25c may have the same width without limitation.

Although it has been disclosed in the above exemplary embodiment that the first claw 25b is connected to the inner surface of the end cover member 25 with the round corner 25e provided between the upper proximal end of the first claw 25b and the inner surface of the end cover member 25 within the space between the movement-suppressing protrusion and the first claw, the first claw 25b may be connected to the inner surface of the end cover member 25 without the round corner 25e without limitation Although it has been disclosed in the above exemplary embodiment that the first claws 25b are configured to engage at the center area (in a claw width direction) with the outmost end 22k of a bottom edge of the secondary lever 22, the first claw 25b may be configured to engage at the entire length with the bottom edge of the secondary lever 22.

Although it has been disclosed in the above exemplary embodiment that the lever member includes the center cover lever 21, a pair of secondary levers 22 and four yoke levers 23, 24, the lever member may be replaced with any other lever member as long as the lever member grips a rubber disposed thereunder. For example, a possible alternative lever member may include grip portions mounted on inner ends of the secondary levers 22 so as to grip the rubber blade 13 including backings 12 embedded therein without yoke levers 24 disposed inside in a longitudinal direction.

Although it has been disclosed in the above exemplary embodiment that the secondary levers 22 are made of a resin material and the yoke levers 23, 24 are made of a metallic material, they may be made of any other materials.

Although it has been disclosed in the above exemplary embodiment that the fin portions 21a, 25a are provided on the center cover lever 21 and the end cover members 25, the fin portions 21a, 25 may not be provided.

Hereinafter, technical ideas which may be conceived from the above embodiment and the alternatives will be described together with effects thereof.

In the wiper lever assembly, the end cover member is provided with a fin portion for converting wind pressure which is applied to a traveling vehicle into a pushing force against the wiping surface. According to the above configuration, while a vehicle is in motion, wind pressure which is applied to the fin portions is converted into a pushing force against a wiping surface, and the converted pushing force is transmitted to the lever member via the end cover member, thus causing the rubber blade to be in secure contact with the wiping surface. Consequently, the reliable wiping action is achieved.

As described above, the present invention provides a wiper lever assembly and a wiper blade which are prevent detachment of end cover members.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wiper lever assembly comprising:
a lever member configured to grip a rubber blade disposed thereunder; and
an end cover member configured to cover an end of the lever member from above, and which includes a plurality of claws formed on both lateral sides thereof, the plurality of claws extending in an inward direction from the end cover and engaging with both lateral sides of a lower surface of the lever member to grip the lever member,
wherein the end cover member includes a support wall which is formed at a center of the end cover member in a width direction and is extended in a downward direction therefrom,
wherein the lever member includes a receptor in which the support wall is fitted from above, and
wherein the claws are formed at two positions of the end cover member spaced apart from each other in a longitudinal direction.

2. The wiper lever assembly as set forth in claim 1, wherein the support wall is divided into two support walls which are formed at positions substantially near the end cover member spaced apart from each other in a longitudinal direction, and
wherein the receptor includes two receptors which are formed to correspond to the respective support walls.

3. The wiper lever assembly as set forth in claim 1, wherein the claws disposed at a position near the longitudinal end of the lever member are formed to have a longitudinal width larger than that of the claws disposed at a position near the longitudinal center of the lever member.

4. The wiper lever assembly as set forth in any of claims 1, wherein the end cover member includes movement-suppressing protrusions which are formed on inner lateral surfaces of the end cover member above the claws and engage with lateral surfaces of the lever member to suppress play of the lever member in a width direction, and
  wherein each of the claws is connected to the inner surface of the end cover member with a round corner formed between the upper proximal end of the claw and the inner surface of the end cover member.

5. The wiper lever assembly as set forth in any of claims 1, wherein the claws disposed at a position near the longitudinal end of the lever member are formed to engage at a center area in a claw width direction with an outmost end of a bottom edge of the lever member.

6. A wiper blade comprising:
  a wiper lever assembly including
    a lever member configured to grip a rubber blade disposed thereunder; and
    an end cover member configured to cover an end of the lever member from above, and which includes a plurality of claws formed on both lateral sides thereof, the plurality of claws extending in an inward direction from the end cover and engaging with both lateral sides of a lower surface of the lever member to grip the lever member,
  wherein the end cover member includes a support wall which is formed at a center of the end cover member in a width direction and is extended in a downward direction therefrom,
  wherein the lever member includes a receptor in which the support wall is fitted from above; and
  a rubber blade gripped by the lever member, and
  wherein the claws are formed at two positions of the end covers members spaced apart from each other in a longitudinal direction.

* * * * *